United States Patent
Sudharsanan et al.

(10) Patent No.: US 7,587,582 B1
(45) Date of Patent: Sep. 8, 2009

(54) METHOD AND APPARATUS FOR PARALLEL ARITHMETIC OPERATIONS

(75) Inventors: Subramania Sudharsanan, Union City, CA (US); Jeffrey Meng Wah Chan, Mountain View, CA (US); Michael F. Deering, Los Altos, CA (US); Marc Tremblay, Palo Alto, CA (US); Scott R. Nelson, Pleasanton, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 2054 days.

(21) Appl. No.: 09/640,901

(22) Filed: Aug. 16, 2000

Related U.S. Application Data

(63) Continuation-in-part of application No. 09/204,480, filed on Dec. 3, 1998, now Pat. No. 6,718,457, and a continuation-in-part of application No. 09/240,977, filed on Jan. 29, 1999, now Pat. No. 6,341,300.

(51) Int. Cl.
    *G06F 7/38* (2006.01)
(52) U.S. Cl. .................. 712/221; 708/100; 708/490
(58) Field of Classification Search ............. 712/221; 708/100, 490
    See application file for complete search history.

(56) References Cited

U.S. PATENT DOCUMENTS

| | | | | |
|---|---|---|---|---|
| 5,845,112 A | * | 12/1998 | Nguyen et al. | 712/221 |
| 5,941,940 A | * | 8/1999 | Prasad et al. | 708/523 |
| 6,078,941 A | * | 6/2000 | Jiang et al. | 708/625 |
| 6,154,831 A | * | 11/2000 | Thayer et al. | 712/208 |
| 6,490,607 B1 | * | 12/2002 | Oberman | 708/620 |
| 6,609,143 B1 | * | 8/2003 | Kanakogi et al. | 708/603 |
| 6,725,355 B1 | * | 4/2004 | Imamura | 712/36 |

FOREIGN PATENT DOCUMENTS

| | | |
|---|---|---|
| JP | 08022451 | 1/1996 |
| WO | WO 96/17293 | 6/1996 |
| WO | WO 00/33185 | 6/2000 |
| WO | WO 00/45251 | 8/2000 |

OTHER PUBLICATIONS

Hennessy et al., Computer Architecture: A Quantative Approach, second edition, pp. 102 and 103.*

K. Nadehara et al, "Low-Power Multimedia RISC", 8207 IEEE Micro, No. 6, Dec. 15, 1995, Los Alamitos, CA, pp. 20-29.

* cited by examiner

*Primary Examiner*—Alford W Kindred
*Assistant Examiner*—Ernest Unelus
(74) *Attorney, Agent, or Firm*—Gunnison, McKay & Hodgson, L.L.P.; Forrest Gunnison

(57) ABSTRACT

A method and apparatus for efficiently performing graphic operations are provided. This is accomplished by providing a processor that supports any combination of the following instructions: parallel multiply-add, conditional pick, parallel averaging, parallel power, parallel reciprocal square root and parallel shifts.

15 Claims, 10 Drawing Sheets

| OPCODE | RD | RS1 | RS2 | RS3 |
|--------|----|----|-----|-----|

FIG. 3A

| OPCODE | RD | RS1 | RS2 |
|--------|----|----|-----|
| OPCODE | RD | RS1 | immediate |

FIG. 3B

| 1000 | RD | RS1 | RS2 | RS3 |

FIG. 4A

| 1100 | RD | RS1 | RS2 | RS3 |

FIG. 4B

| 000100000011 | RD | RS1 | RS2 |

FIG. 4C

| 00100101010 | RD | RS1 | RS2 |
| 00101101010 | RD | RS1 | immediate |

FIG. 4D

| 00100101001 | RD | RS1 | RS2 |
| 00101101001 | RD | RS1 | immediate |

FIG. 4E

| 00100101000 | RD | RS1 | RS2 |
| 00101101000 | RD | RS1 | immediate |

FIG. 4F

METHOD AND APPARATUS FOR PARALLEL ARITHMETIC OPERATIONS

CROSS-REFERENCE TO RELATED APPLICATION

This application is a continuation-in-part of U.S. application Ser. No. 09/204,480, filed on Dec. 3, 1998, now U.S. Pat. No. 6,718,457 naming as inventors Marc Tremblay and William Joy, and is a continuation-in-part of U.S. application Ser. No. 09/240,977 filed on Jan. 29, 1999, now U.S. Pat. No. 6,341,300 naming as inventors Ravi Shankar and Subramania Sudharsanan.

BACKGROUND OF THE INVENTION

1. Field of the Invention

The present invention relates generally to processors and, more particularly to instructions for use with processors.

2. Related Art

In order to support speech and audio processing, signal processing and 2-D and 3-D graphics, processors must be able to support fast graphics operations. However, prior art general purpose processors have provided little or no hardware support for this type of operations. By contrast, special purpose graphics and media processors provide hardware support for specialized operations. As a result, using prior art processors, graphical operations were performed mostly with the aid of a specialized graphics/media processor.

As the demand for graphics/media support in general purpose processors rises, hardware acceleration of these operations becomes more and more important.

As a result, there is a need for a general purpose processor that allows for efficient processing of these operations.

SUMMARY OF THE INVENTION

The present invention provides a method and apparatus for efficiently performing graphic operations. This is accomplished by providing a processor that supports any combination of the following instructions: parallel multiply-add, conditional pick, parallel averaging, parallel power, parallel reciprocal square root and parallel shifts. In some embodiments, the results of these operations are further saturated within specified numerical ranges.

BRIEF DESCRIPTION OF THE DRAWINGS

FIG. 3A is a block diagram showing instruction formats for four-operand instructions supported by the processor of FIG. 1B.

FIG. 3B is a block diagram showing instruction formats for three-operand instructions supported by the processor of FIG. 1B.

FIG. 4A is a block diagram showing an instruction format for a parallel multiply-add instruction supported by the processor of FIG. 1B.

FIG. 4B is a block diagram showing an instruction format for a conditional pick instruction supported by the processor of FIG. 1B.

FIG. 4C is a block diagram showing an instruction format for a parallel mean instruction supported by the processor of FIG. 1B.

FIG. 4D is a block diagram showing instruction formats for a parallel logical shift left instruction supported by the processor of FIG. 1B.

FIG. 4E is a block diagram showing instruction formats for a parallel arithmetic shift right instruction supported by the processor of FIG. 1B.

FIG. 4F is a block diagram showing instruction formats for a parallel logical shift right instruction supported by the processor of FIG. 1B.

DETAILED DESCRIPTION OF THE INVENTION

A processor in accordance to the principles of the present invention is illustrated in FIG. 1.

Figure 1A:
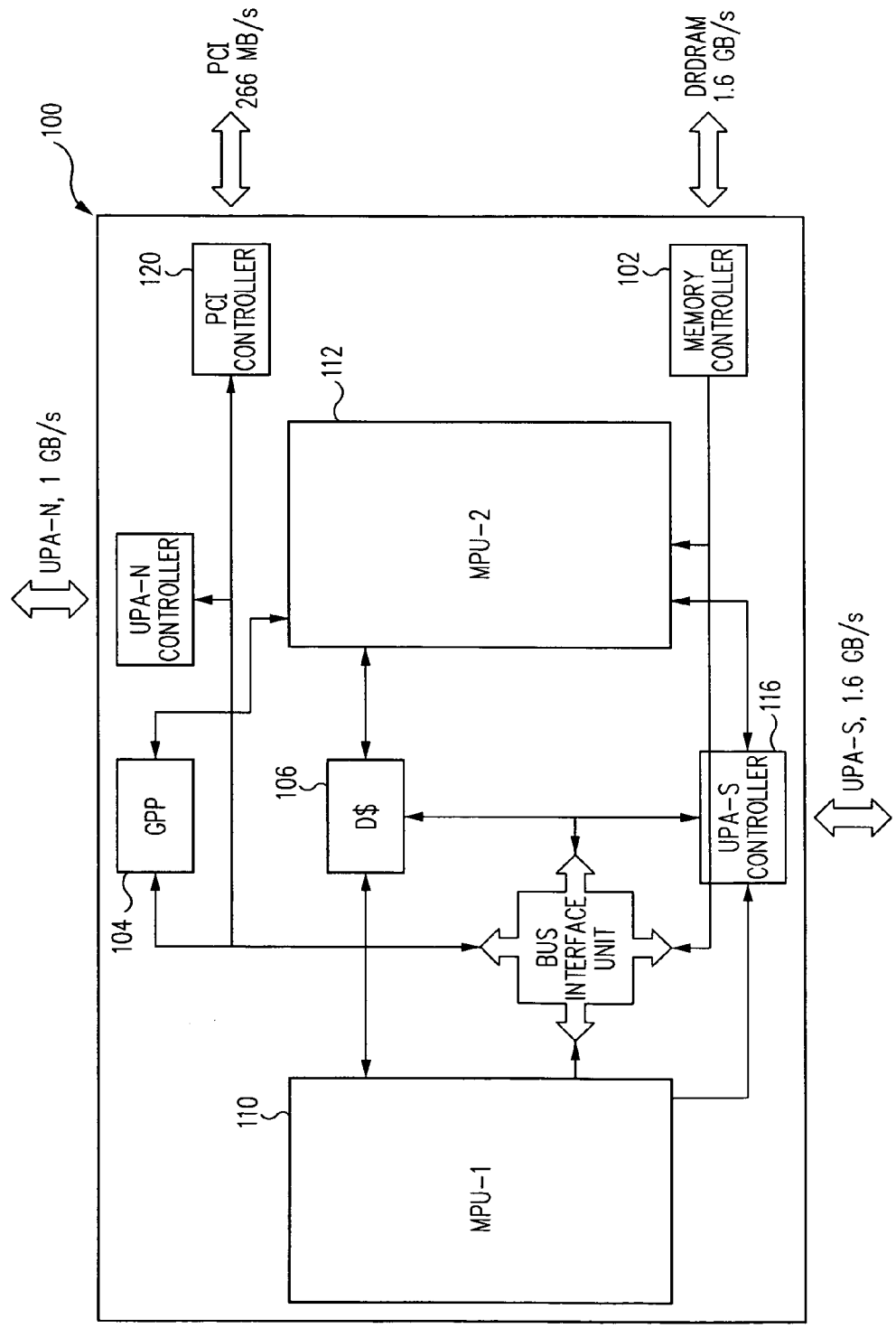
FIG. 1A is a schematic block diagram illustrating a single integrated circuit chip implementation of a processor in accordance with an embodiment of the present invention.

Referring to FIG. 1A, a schematic block diagram illustrates a single integrated circuit chip implementation of a processor 100 that includes a memory interface 102, a geometry decompressor 104, two media processing units 110 and 112, a shared data cache 106, and several interface controllers. The interface controllers support an interactive graphics environment with real-time constraints by integrating fundamental components of memory, graphics, and input/output bridge functionality on a single die. The components are mutually linked and closely linked to the processor core with high bandwidth, low-latency communication channels to manage multiple high-bandwidth data streams efficiently and with a low response time. The interface controllers include a an UltraPort Architecture Interconnect (UPA) controller 116 and a peripheral component interconnect (PCI) controller 120. The illustrative memory interface 102 is a direct Rambus dynamic RAM (DRDRAM) controller. The shared data cache 106 is a dual-ported storage that is shared among the media processing units 110 and 112 with one port allocated to each media processing unit. The data cache 106 is four-way set associative, follows a write-back protocol, and supports hits in the fill buffer (not shown). The data cache 106 allows fast data sharing and eliminates the need for a complex, error-prone cache coherency protocol between the media processing units 110 and 112.

Two media processing units 110 and 112 are included in a single integrated circuit chip to support an execution environment exploiting thread level parallelism in which two independent threads can execute simultaneously. The threads may arise from any sources such as the same application, different applications, the operating system, or the runtime environment. Parallelism is exploited at the thread level since parallelism is rare beyond four, or even two, instructions per cycle in general purpose code. For example, the illustrative processor 100 is an eight-wide machine with eight execution units for executing instructions. Typical "general-purpose" processing code has an instruction level parallelism of about two so that, on average, most (about six) of the eight execution units would be idle at any time. The illustrative processor 100 employs thread level parallelism and operates on two independent threads, possibly attaining twice the performance of a processor having the same resources and clock rate but utilizing traditional non-thread parallelism.

Although the processor 100 shown in FIG. 1A includes two processing units on an integrated circuit chip, the architecture is highly scaleable so that one to several closely-coupled processors may be formed in a message-based coherent architecture and resident on the same die to process multiple threads of execution. Thus, in the processor 100, a limitation on the number of processors formed on a single die thus arises from capacity constraints of integrated circuit technology rather than from architectural constraints relating to the interactions and interconnections between processors.

Figure 1B:
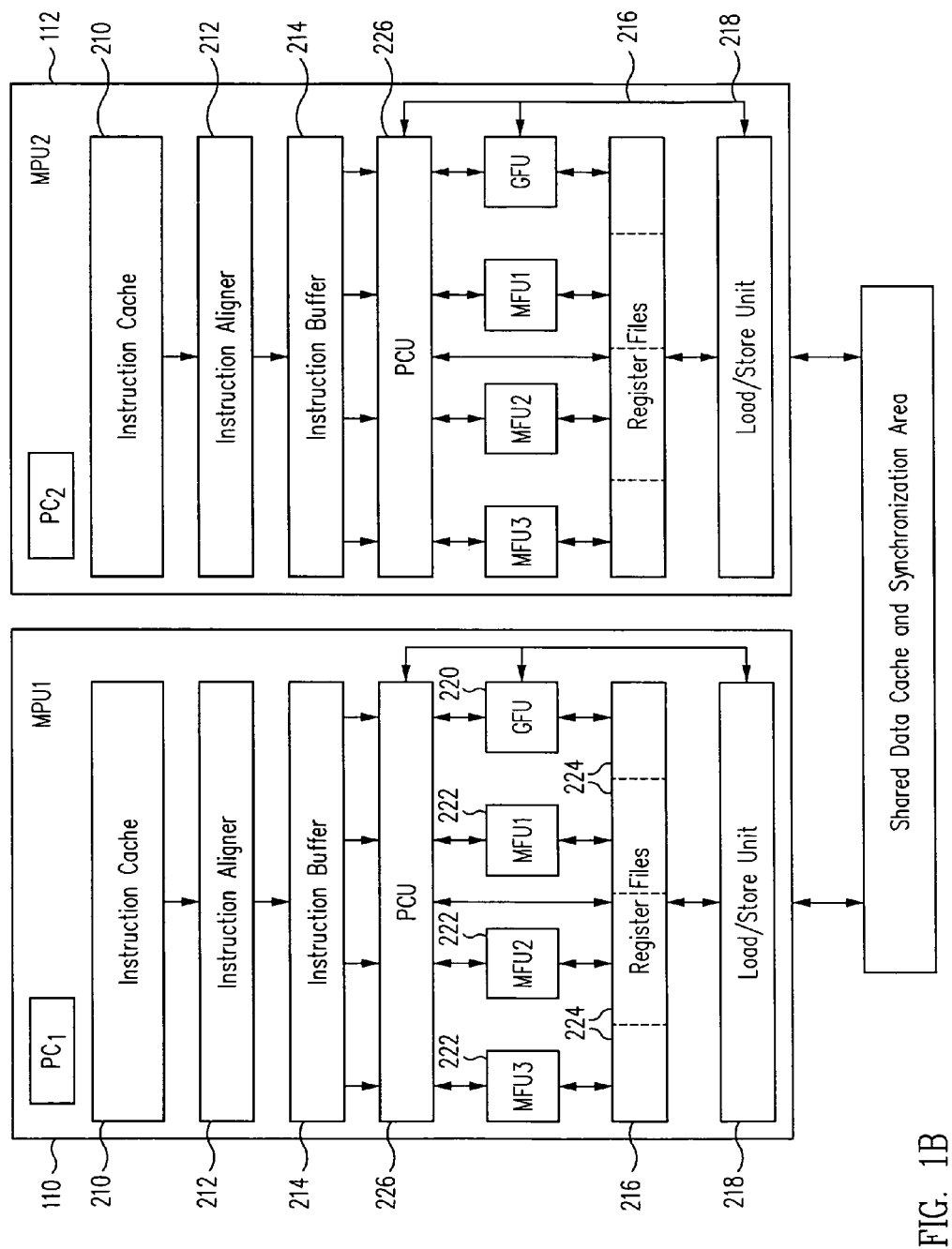
FIG. 1B is a schematic block diagram showing the core of the processor.

Referring to FIG. 1B, a schematic block diagram shows the core of the processor 100. The media processing units 110 and 112 each include an instruction cache 210, an instruction aligner 212, an instruction buffer 214, a pipeline control unit 226, a split register file 216, a plurality of execution units, and a load/store unit 218. In the illustrative processor 100, the media processing units 110 and 112 use a plurality of execution units for executing instructions. The execution units for a media processing unit 110 include three media functional units (MFU) 222 and one general functional unit (GFU) 220. The media functional units 222 are multiple single-instruction-multiple-data (MSIMD) functional units. Each of the media functional units 222 is capable of processing parallel 16-bit components. Various parallel 16-bit operations supply the single-instruction-multiple-data capability for the processor 100 including add, multiply-add, shift, compare, and the like. The media functional units 222 operate in combination as tightly-coupled digital signal processors (DSPs). Each media functional unit 222 has a separate and individual sub-instruction stream, but all three media functional units 222 execute synchronously so that the subinstructions progress lock-step through pipeline stages.

The general functional unit 220 is a RISC processor capable of executing arithmetic logic unit (ALU) operations, loads and stores, branches, and various specialized and esoteric functions such as parallel power operations, reciprocal squareroot operations, and many others. The general functional unit 220 supports less common parallel operations such as the parallel reciprocal square root instruction.

The pipeline control unit 226 is connected between the instruction buffer 214 and the functional units and schedules the transfer of instructions to the functional units. The pipeline control unit 226 also receives status signals from the functional units and the load/store unit 218 and uses the status signals to perform several control functions. The pipeline control unit 226 maintains a scoreboard, generates stalls and bypass controls. The pipeline control unit 226 also generates traps and maintains special registers.

Each media processing unit 110 and 112 includes a split register file 216, a single logical register file including 224 32-bit registers. The split register file 216 is split into a plurality of register file segments 224 to form a multi-ported structure that is replicated to reduce the integrated circuit die area and to reduce access time. A separate register file segment 224 is allocated to each of the media functional units 222 and the general functional unit 220. In the illustrative embodiment, each register file segment 224 has 128 32-bit registers. The first 96 registers (0-95) in the register file segment 224 are global registers. All functional units can write to the 96 global registers. The global registers are coherent across all functional units (MFU and GFU) so that any write operation to a global register by any functional unit is broadcast to all register file segments 224. Registers 96-127 in the register file segments 224 are local registers. Local registers allocated to a functional unit are not accessible or "visible" to other functional units.

The media processing units 110 and 112 are highly structured computation blocks that execute software-scheduled data computation operations with fixed, deterministic and relatively short instruction latencies, operational characteristics yielding simplification in both function and cycle time. The operational characteristics support multiple instruction issue through a pragmatic very large instruction word (VLIW) approach that avoids hardware interlocks to account for software that does not schedule operations properly. Such hardware interlocks are typically complex, error-prone, and create multiple critical paths. A VLIW instruction word always includes one instruction that executes in the general functional unit (GFU) 220 and from zero to three instructions that execute in the media functional units (MFU) 222. A MFU instruction field within the VLIW instruction word includes an operation code (opcode) field, three source register (or immediate) fields, and one destination register field.

Instructions are executed in-order in the processor 100 but loads can finish out-of-order with respect to other instructions and with respect to other loads, allowing loads to be moved up in the instruction stream so that data can be streamed from main memory. The execution model eliminates the usage and overhead resources of an instruction window, reservation stations, a re-order buffer, or other blocks for handling instruction ordering. Elimination of the instruction ordering structures and overhead resources is highly advantageous since the eliminated blocks typically consume a large portion of an integrated circuit die. For example, the eliminated blocks consume about 30% of the die area of a Pentium II processor.

Processor 100 is further described in co-pending application Ser. No. 09/204,480, entitled "A Multiple-Thread Processor for Threaded Software Applications" by Marc Tremblay and William Joy, filed on Dec. 3, 1998, which is herein incorporated by reference in its entirety.

Figure 2A:
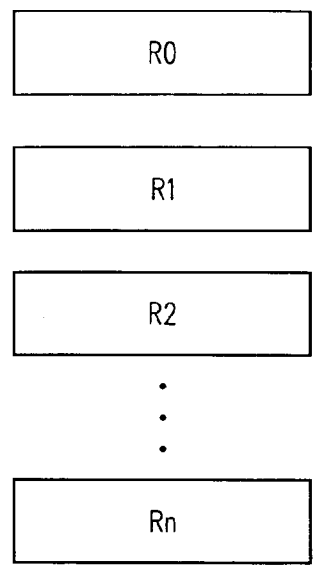
FIG. 2A is a block diagram of a register file of the processor of FIG. 1B.
Figure 2B:
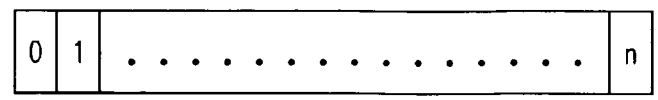
FIG. 2B is a block diagram of a register of the register file of FIG. 2A.

The structure of a register file of the processor of FIG. 1B is illustrated in FIG. 2A. The register file is made up of an arbitrary number of registers R0, R1, R2 . . . Rn. Each of registers R0, R1, R2 . . . Rn, in turn has an arbitrary number of bits n, as shown in FIG. 2B. In one embodiment, the number of bits in each of registers R0, R1, R2 . . . Rn is 32. However, those skilled in the art realize that the principles of the present invention can be applied to an arbitrary number of registers each having an arbitrary number of bits. Accordingly, the present invention is not limited to any particular number of registers or bits per register.

FIG. 3A illustrates an instruction format for four-operand instructions supported by the processor of FIG. 1B. The instruction format has a 4-bit opcode and four 7-bit operands. The first of the operands is a reference to a destination register (RD) for the instruction. The second operand, in turn, is a reference to a first source register for the instruction (RS1). The third operand is a reference to a second source register for the instruction (RS2) and the fourth operand is a reference to a third source register for the instruction (RS3).

FIG. 3B illustrates two instruction formats for three-operand instructions supported by the processor of FIG. 1B. Each instruction format has an 11-bit opcode and three 7-bit operands. The first of the operands is a reference to a destination register (RD) for the instruction. The second operand, in turn, is a reference to a first source register for the instruction (RS1). Finally, the third operand can be a references to a second (RS2) source register or an immediate value to be used in the instruction.

FIG. 4A illustrates an instruction format for a parallel multiply-add instruction (pmuladd) supported by the processor of FIG. 1B, in accordance to the present invention. The pmuladd instruction uses the four-operand instruction format of FIG. 3A, namely a format in which no immediate values are used. Rather, all operands are references to registers in the register file of the processor. FIG. 4B illustrates an instruction format for a conditional pick instruction (cpickz) supported by the processor of FIG. 1B. The cpickz instruction uses the four-operand instruction format of FIG. 3A. FIG. 4C illustrates an instruction format for a parallel mean instruction (pmean) supported by the processor of FIG. 1B. The pmean instruction uses the first of the three-operand instruction formats of FIG. 3B, namely a format in which no immediate values are used. FIG. 4D illustrates instruction formats for a pshll instruction supported by the processor of FIG. 1B. The pshll instruction uses either of the three-operand instruction formats of FIG. 3B. FIG. 4E illustrates instruction formats for a pshra instruction supported by the processor of FIG. 1B. The pshra instruction uses either of the three-operand instruction formats of FIG. 3B. FIG. 4F illustrates instruction formats for a pshrl instruction supported by the processor of FIG. 1B. The pshrl instruction uses either of the three-operand instruction formats of FIG. 3B.

Figure 5:
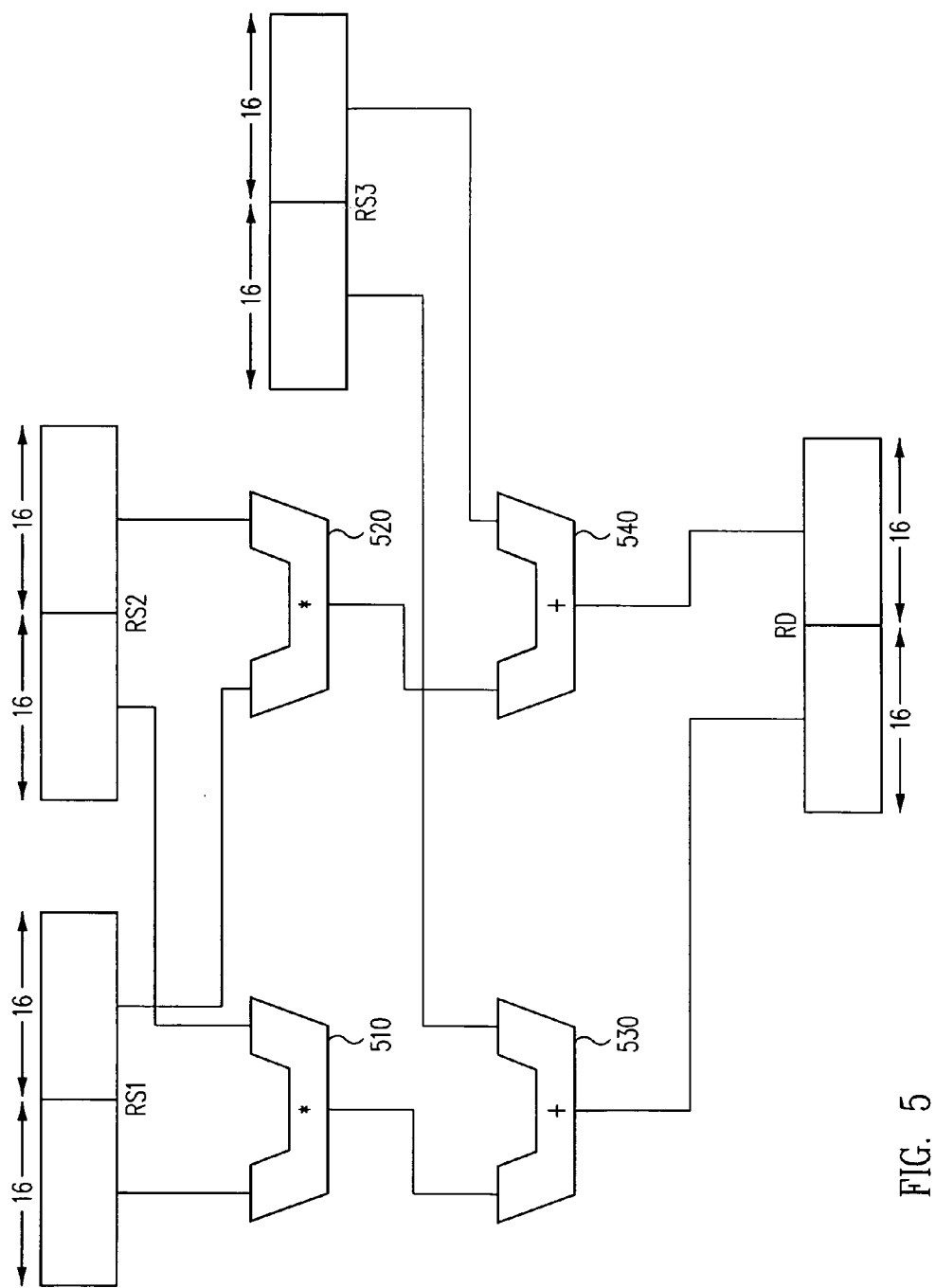
FIG. 5 is a block diagram of one implementation of the circuitry within MFUs 222 of the processor of FIG. 1B for performing the pmuladd instruction of FIG. 4A.

FIG. 5 is a block diagram of one implementation of the circuitry within MFUs 222 of the processor of FIG. 1B for performing a parallel multiply-add operation. The pmuladd instruction treats values stored in the source registers as each having two 16-bit fixed-point components. For example, in FIG. 5, bits 0 . . . 15 of the values stored in registers RS1, RS2 and RS3 comprise the first fixed-point operands and bits 16 . . . 31 comprise the second fixed-point operands. The multiply-add operation is then carried out separately on the first operands and on the second operands. As a result, after the execution of a pmuladd instruction, the value stored in register RD represents two 16 bit fixed-point values, one representing a value calculated by multiplying the first fixed-point operand of RS1 by the first fixed-point operand of RS2 and adding the first fixed-point operand of RS3, and the other representing a value calculated by multiplying the second fixed-point operand of RS1 by the second fixed-point operand of RS2 and adding the second fixed-point operand of RS3.

In the implementation shown in FIG. 5, when executing a pmuladd instruction, the processor routes the value of bits 0 . . . 15 (high-order bits) of RS1 and RS2 to respective input ports of multiplier 510, while the value of bits 16 . . . 31 (low-order bits) of RS1 and RS2 are routed to respective input ports of multiplier 520. After a time delay for propagating the input values through multipliers 510 and 520, values on respective output ports of multipliers 510 and 520 are routed to respective input ports of adders 530 and 540. The value of bits 0 . . . 15 of RS3 is then routed to the other input port of adder 530 and the values of bits 16 . . . 31 of RS3 are routed to the other input port of adder 540. After a time delay for propagating the input values through adders 530 and 540, a value on an output port of adder 530 is stored in bits 0 . . . 15 of register RD, while a value on an output port of adder 540 is stored in bits 16 . . . 31 of register RD.

The results depend on the values of two mode/format bits. The operands can be either in fixed-point format or in integer format. As shown in Table 1, when the mode bits have 00 and 01 values, both the operands and the result are treated as two's complement 16-bit integer values. When the mode bits have a 10 value, the operands and the result are treated as S.15 fixed-point values. Finally, if the mode bits have a 11 value, the operands and the result are treated as S2.13 fixed point values. Hence, depending on the value of the mode bits the appropriate bits from the multiplier results are supplied to the adder.

Moreover, the processor of FIG. 1B supports saturation functions to be performed during pmuladd, padd and psub operations. Four different saturation modes are provided, as shown in Table 1 below.

TABLE 1

| mode | format | Bounds | |
|---|---|---|---|
| | | Low | High |
| 00 | Integer | 0000000000000000 | 0111111111111111 |
| 01 | Integer | 1000000000000000 | 0111111111111111 |
| 10 | S.15 | 1000000000000000 | 0111111111111111 |
| 11 | S2.13 | 1110000000000000 | 0010000000000000 |

Saturation modes 00 and 01 in Table 1 represent two's complement 16-bit integers. Mode 10 represents an S.15 fixed point notation, while mode 11 represents an S2.13 fixed point format. In both of these notations, the S bit is part of the integer part of the fixed point number. For example, an S2.13 number has a 3-bit integer part and a 13-bit fractional part.

Using mode 00, the parallel muladd with saturation instruction will produce a value between 0 and $2^{15}-1$, inclusive. If the results exceed these bounds, they are "capped" at the upper bound. Similarly, mode 01 limits the result to between $-2^{15}$ and $2^{15}-1$, inclusive. Modes 10 and 11 represent saturation for fixed point formats. Table 1 summarizes the limits or bounds for all four modes.

Execution of these instructions is pipelined to achieve a throughput of one instruction per cycle.

Figure 6:
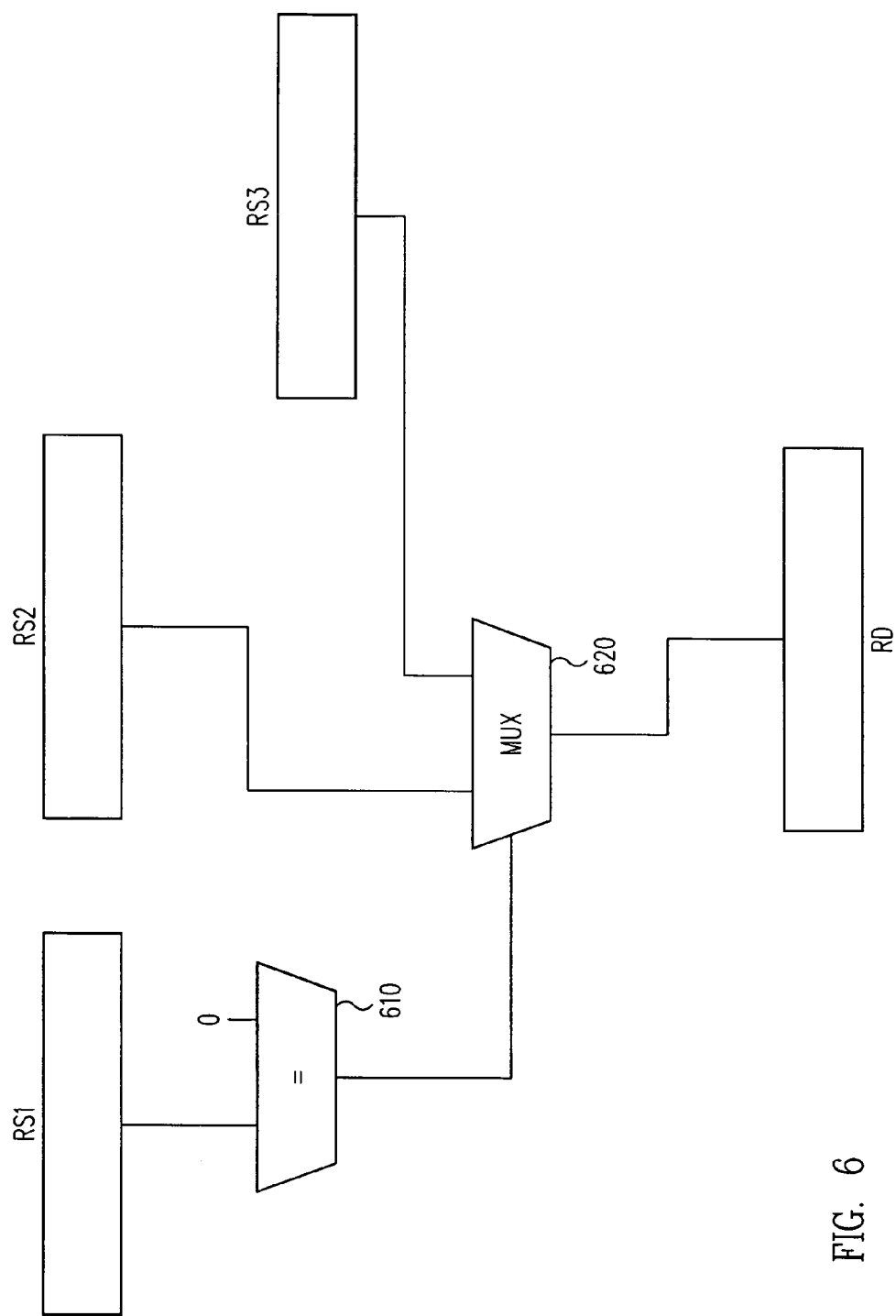
FIG. 6 is a block diagram of one implementation of the circuitry within MFUs 222 of the processor of FIG. 1B for performing the cpickz instruction of FIG. 4B.

FIG. 6 is a block diagram of one implementation of the circuitry within MFUs 222 of the processor of FIG. 1B for performing a conditional pick operation. The cpickz instruction compares a value stored in register RS1 to a zero value and depending on the outcome of the comparison copies the values stored in either register RS2 or register RS3 into register RD.

In the implementation of FIG. 6, when executing a cpickz instruction, the processor routes a value stored in register RS1 to an input port of comparator 610. A zero value is supplied on the other input port of comparator 610. After a time delay for propagating the input values through comparator 610, a value on an output port of comparator 610 is routed to a control port of multiplexer 620. Meanwhile, values stored in registers RS2 and RS3 are routed by the processor to respective input ports of multiplexer 620. After a time delay for propagating input values through multiplexer 620, a value on an output port of multiplexer 620 is stored in register RD.

As a result, after the execution of a cpickz instruction, the value stored in register RD is a copy of the value stored in register RS2 if the value stored in register RS1 is not equal to 0. Alternatively, if the value stored in register RS1 is equal to 0, the value stored in register RD is a copy of the value stored in register RS3.

Figure 7:
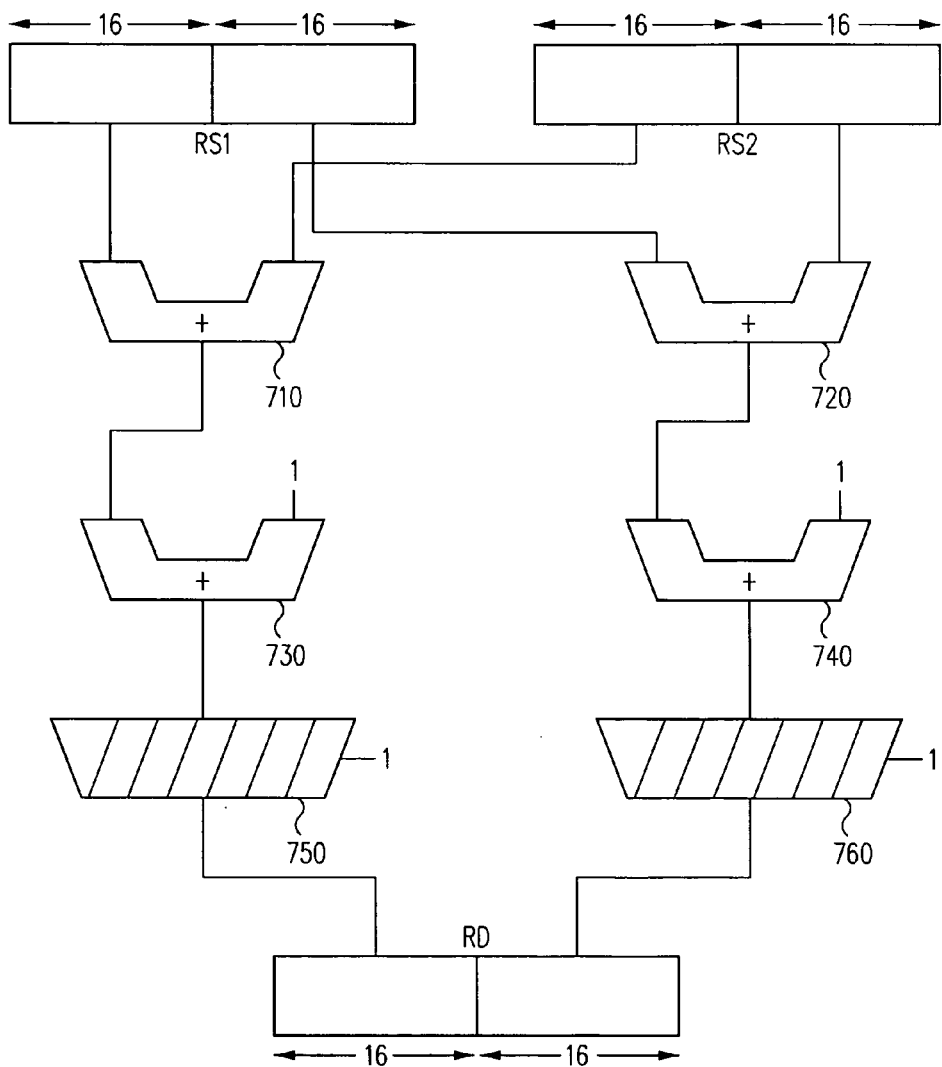
FIG. 7 is a block diagram of one implementation of the circuitry within MFUs 222 of the processor of FIG. 1B for performing the pmean instruction of FIG. 4C.

FIG. 7 is a block diagram of one implementation of the circuitry within MFUs 222 of the processor of FIG. 1B for performing a parallel averaging operation. The pmean instruction treats values stored in the source registers as each having two 16-bit integer components. For example, in FIG. 7, bits 0 . . . 15 of the values stored in registers RS1 and RS2 comprise the first integer operands and bits 16 . . . 31 comprise the second integer operands. The averaging operation is then carried out separately on the first operands and on the second operands. As a result, after the execution of a pmean instruction, the value stored in register RD represents two 16 bit integer values, one representing a value calculated by averaging the first integer operand of RS1 with the first integer operand of RS2, and the other representing a value calculated by averaging the second integer operand of RS1 with the second integer operand of RS2.

In the implementation of FIG. 7, when executing a pmean instruction, the processor routes values stored in bits 0 . . . 15 of registers RS1 and RS2 to respective input ports of adder 710. Meanwhile, values stored in bits 16 . . . 31 of registers RS1 and RS2 are routed to respective input ports of adder 720. After a time delay for propagating the input values through adders 710 and 720, values on respective output ports of adders 710 and 720 are routed to respective input ports of adders 730 and 740. A 1 value is supplied on respective input ports of adders 730 and 740. After a time delay for propagating the input values through adders 730 and 740, output values on respective ports of adders 730 and 740 are routed to respective input ports of right shifters 750 and 760. A logical one value is supplied on respective control ports of right shifters 750 and 760. After a time delay for propagating the input values through right shifters 750 and 760, a value on an output port of right shifter 750 is copied into bits 0 . . . 15 of register RD and a value on an output port of right shifter 760 is copied into bits 16 . . . 31 of register RD.

Figure 8A:
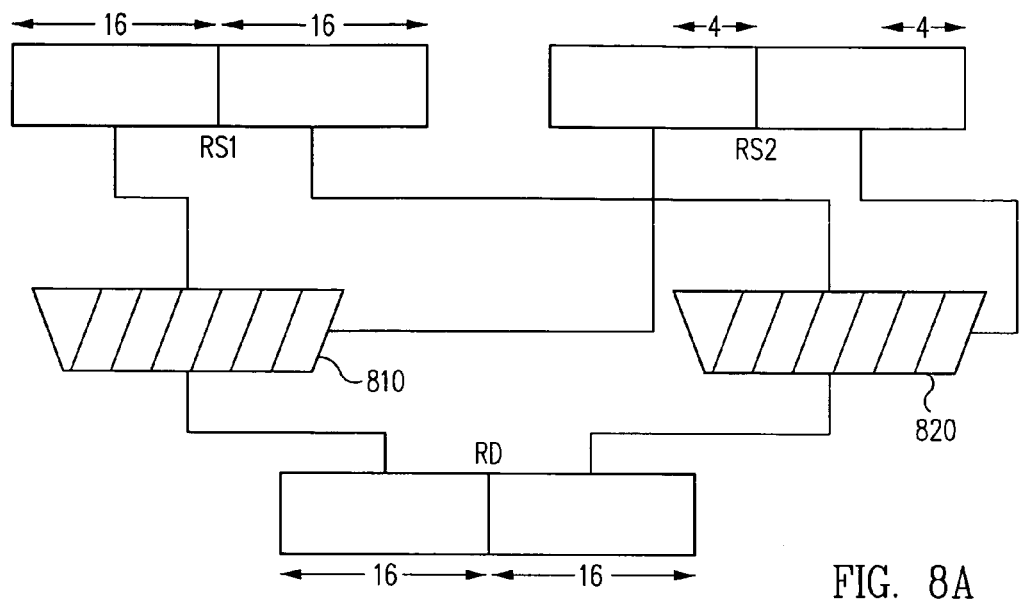
FIG. 8A is a block diagram of one implementation of the circuitry within MFUs 222 of the processor of FIG. 1B for performing any of the parallel shift instructions of FIG. 4D, 4E or 4F, when operands are register references.

FIG. 8A is a block diagram of one implementation of the circuitry within MFUs 222 of the processor of FIG. 1B for performing a parallel shift operation, when all operands are provided as register references. The pshll instruction treats values stored in the source registers as each having two 16-bit integer components. For example, in FIG. 8A, bits 0 . . . 15 of the values stored in registers RS1 and RS2 comprise the first integer operands and bits 16 . . . 31 comprise the second integer operands. The logical shift left operation is then carried out separately on the first operands and on the second operands. As a result, after the execution of a pshll instruction, the value stored in register RD represents two 16 bit integer values, one representing a value calculated by performing a logical shift left of the first integer operand of RS1 by a number of bits specified by the first integer operand of RS2, and the other representing a value calculated by performing a logical shift left on the second integer operand of RS1 by a number of bits specified by the second integer operand of RS2.

In the implementation of FIG. 8A, when executing the pshll instruction, the processor routes the value stored in bits 0 . . . 15 of register RS1 to an input port of shifter 810. Meanwhile, the value stored in bits 16 . . . 31 of register RS1 are routed to an input port of shifter 820. The processor also routes bits 0 . . . 3 of registers RS1 and RS2 to respective select ports of shifters 810 and 820. After a time delay for propagating the input values through shifters 810 and 820, a value on an output port of shifter 810 is copied into bits 0 . . . 15 of register RD and a value on an output port of shifter 820 is copied into bits 16 . . . 31 of register RD.

Figure 8B:
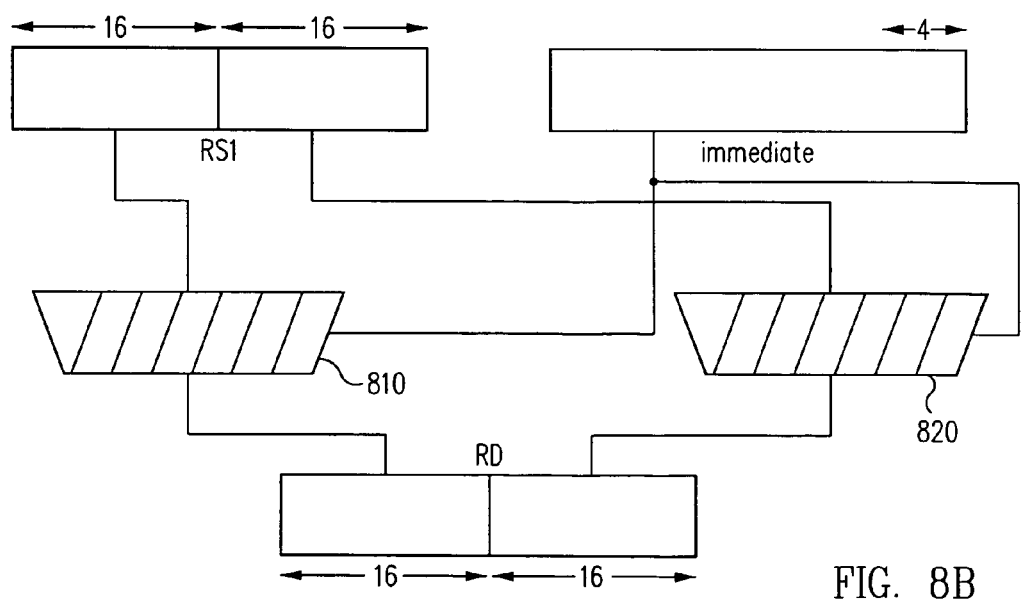
FIG. 8B is a block diagram of one implementation of the circuitry within MFUs 222 of the processor of FIG. 1B for performing any of the parallel shift instructions of FIG. 4D, 4E or 4F, when one of the operands is an immediate value.

FIG. 8B is a block diagram of one implementation of the circuitry within MFUs 222 of the processor of FIG. 1B for performing a parallel shift operation, when the second source operand is provided as an immediate value. The functioning of the circuitry of FIG. 8B is identical to that of the circuitry of FIG. 8A, except that bits 0 . . . 3 of the immediate value are routed to both input ports of shifters 810 and 820.

The operation of the circuitry of FIGS. 8A and 8B during execution of a pshra or a pshrl instructions is identical to the one described for the execution of a pshll instruction, except that shifters 810 and 820 perform an arithmetic shift right or a logical shift right operations, respectively.

In addition, the processor of FIG. 1B supports a parallel power instruction, ppower and a parallel reciprocal square root instruction precsqrt. The ppower and precsqrt instruction treat the values stored in the source registers as a pair of fixed-point (rather than integer) components. Therefore, the value stored in bits 0 . . . 15 of register RD after the execution of a ppower instruction represent a value calculated by raising the value stored in bits 0 . . . 15 of register RS1 to a power specified by the value stored in bits 0 . . . 15 of register RS2. Similarly, the value stored in bits 16 . . . 31 of register RD after the execution of a ppower instruction represent a value calculated by raising the value stored in bits 16 . . . 31 of register RS1 to a power specified by the value stored in bits 16 . . . 31 of register RS2. The pair of values stored in register RD after the execution of a precsqrt instruction are calculated using a similar process to the one described for the ppower instruction, except that the reciprocal square roots of the pairs of values stored in register RS1 are computed, rather than a power.

The precsqrt instruction is further described in co-pending application Ser. No. 09/240,977 titled "Parallel Fixed Point Square Root And Reciprocal Square Root Computation Unit In A Processor" by Ravi Shankar and Subramania Sudharsanan, which is incorporated by reference herein in its entirety.

Embodiments described above illustrate but do not limit the invention. In particular, the invention is not limited by any number of registers or immediate values specified by the instructions. In addition, the invention is not limited to any particular hardware implementation. Those skilled in the art realize that alternative hardware implementation can be employed in lieu of the one described herein in accordance to the principles of the present invention. Other embodiments and variations are within the scope of the invention, as defined by the following claims.

The invention claimed is:

1. A method of executing a single instruction parallel multiply-add function on a processor, the method comprising:
providing the processor with an opcode indicating a parallel multiply-add instruction having at least three source operands wherein each source operand includes at least two operand components;
providing the processor with a first, a second and a third value of a first source operand, a second source operand and a third source operand, respectively in said at least three source operands, wherein each of the values comprises two or more of said at least two operand components and further wherein the first, second and third values are stored in respective source registers of the processor specified by the parallel multiply-add instruction;

multiplying first operand components of the first and the second values to generate a first intermediate value;

multiplying second operand components of the first and the second values to generate a second intermediate value;

adding a first operand component of the third value to the first intermediate value to generate a first result value;

adding a second operand component of the third value to the second intermediate value to generate a second result value;

storing the first result value in a first portion of a result location; and storing the second result value in a second portion of the result location wherein the result location is a destination register of the processor specified by the parallel multiply-add instruction wherein said processor also supports at least one instruction in a set of instructions consisting of a parallel averaging instruction, a parallel shift instruction, a parallel power instruction, and a parallel reciprocal square root instruction.

2. The method of claim 1, wherein the processor is pipelined and the single instruction is executed with a throughput of one instruction every 2 cycles.

3. A processor comprising:

a first and second multiplier path;

a first and second adder path; and wherein the processor supports a parallel multiply-add instruction and also supports at least one instruction in a set of instructions consisting of a parallel averaging instruction, a parallel shift instruction, a parallel power instruction, and a parallel reciprocal square root instruction, the parallel multiply add instruction having at least three source operands and each source operand includes at least two operand components, said parallel multiply-add instruction executable to cause the processor to, in parallel, route a first component of a first source operand and a first component of a second source operand to the first multiplier path and a second component of the first source operand and a second component of the second source operand to the second multiplier path, in parallel, route output of the first multiplier path and a first component of a third source operand to the first adder path, and output of the second multiplier path and a second component of the third source operand to the second adder path, and store output of the first adder path at a first location and output of the second adder path at a second location wherein the first and the second locations are in a destination register of the processor specified by the parallel multiply-add instruction.

4. The processor of claim 3, wherein the results of the parallel multiply-add instruction are saturated.

5. The processor of claim 3, wherein the processor provides multiple saturation modes.

6. The processor of claim 3, wherein the processor further supports a conditional pick instruction, the conditional pick instruction executable to cause the processor to compare a first value to zero and to copy either a second value or a third value to a destination location depending on the comparison.

7. The processor of claim 3, wherein the processor further supports the parallel averaging instruction, the parallel averaging instruction executable to cause the processor to average a first operand's first component and a second operand's first component, and, in parallel, to average the first operand's second component and the second operand's second component.

8. The processor of claim 3, wherein the processor further supports the parallel shift instruction, the parallel shift instruction executable to cause the processor to logically shift a first portion of a first value in accordance with a first portion of a second value, and, in parallel, shift a second portion of the first value in accordance with a second portion of the second value.

9. The processor of claim 3 wherein the processor further supports the parallel power instruction, the parallel power instruction executable to cause the processor to, raise a first component of a first operand to a power indicated in a first component of a second operand and, in parallel, raise a second component of a the first operand to a power indicated in a second component of the second operand.

10. The processor of claim 3 wherein the processor further supports the parallel reciprocal square root instruction, the parallel reciprocal square root instruction executable to cause the processor to, determine a reciprocal square root of an operand's first component and, in parallel, determine a reciprocal square root of the operand's second component.

11. A computer program product encoded on one or more machine-readable media, the computer program product comprising:

an instruction sequence, the instruction sequence including an instance of a parallel multiply add instruction;

the instance of the parallel multiply add instruction having an at least four operand instruction format including at least three source operands and a result operand wherein each source operand includes at least two operand components and said result operand includes at least two components, wherein execution of the parallel multiply add instruction on a processor causes generation of a first product from a first source operand's first component and a second source operand's first component, in parallel with generation of a second product from the first source operand's second component and the second source operand's second component, causes generation of a first sum from the first product and a third source operand's first component, in parallel with generation of a second sum from the second product and the third source operand's second component, and causes the first sum to be stored in accordance with the result operand's first component and the second sum to be stored in accordance with the result operand's second component wherein said processor also supports at least one instruction in a set of instructions consisting of a parallel averaging instruction, a parallel shift instruction, a parallel power instruction, and a parallel reciprocal square root instruction.

12. A method of executing an instruction instance comprising:

generating, on a processor, a first product and a second product in parallel, wherein the first product is from a first value in a first portion of a first source operand of said instruction and a second value in a first portion of a second source operand of said instruction and the second product is from a third value in a second portion of said first source operand of said instruction and a fourth value in a second portion of the second source operand of said instruction;

generating, on the processor, a first sum and a second sum in parallel, wherein the first sum is from the first product and a fifth value in a first portion of a third source operand of said instruction and the second sum is from the second product and a sixth value in a second portion of the third source operand of said instruction;

storing the first sum in a first portion of a result location; and storing the second sum, in parallel with said storing the first sum, in a second portion of the result location wherein the result location is a destination register of the processor specified by the parallel multiply-add instruction and further wherein said processor also supports at least one instruction in a set of instructions consisting of a parallel averaging instruction, a parallel shift instruction, a parallel power instruction, and a parallel reciprocal square root instruction.

13. The method of claim 12 wherein the instruction instance is executed by a pipelined processor that performs operations for the instruction instance in 2 cycles.

14. The method of claim 12 embodied as a computer program product encoded in one or more machine-readable media.

15. The processor of claim 7 further comprising:

a plurality of adder paths; and a plurality of shifter paths;

wherein the parallel averaging instruction, when executed, causes the processor to, route the first operand's first component and the second operand's second component to a first of the plurality of adder paths, and, in parallel, route the first operand's second component and the second operand's second component to a second of the plurality of adder paths;

after propagation delay, route output of the first adder path and a one value to a third of the plurality of adder paths, and, in parallel, route output of the second adder path and a one value to fourth of the plurality of adder paths; after propagation delay, route output of the third adder path and a first control value a first of the plurality of shifter paths, and, in parallel, route output of the fourth adder path and a second control value to a second of the plurality of shifter paths.

* * * * *